(12) United States Patent
Jones-McFadden (10) Patent No.: US 10,003,686 B2
(45) Date of Patent: Jun. 19, 2018

(54) SYSTEM FOR REMOTELY CONTROLLING ACCESS TO A MOBILE DEVICE

(71) Applicant: BANK OF AMERICA CORPORATION, Charlotte, NC (US)

(72) Inventor: Alicia C. Jones-McFadden, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 311 days.

(21) Appl. No.: 14/987,754

(22) Filed: Jan. 4, 2016

(65) Prior Publication Data

US 2017/0195477 A1 Jul. 6, 2017

(51) Int. Cl.
| | | |
|---|---|---|
| *H04W 4/02* | (2018.01) | |
| *H04M 1/725* | (2006.01) | |
| *G06Q 20/10* | (2012.01) | |
| *G06Q 20/32* | (2012.01) | |
| *G06Q 20/40* | (2012.01) | |

(52) U.S. Cl.
CPC ........ *H04M 1/72577* (2013.01); *G06Q 20/10* (2013.01); *G06Q 20/3224* (2013.01); *G06Q 20/4016* (2013.01); *H04W 4/025* (2013.01)

(58) Field of Classification Search
CPC .............. H04M 1/72577; G06Q 20/10; G06Q 20/3224; G06Q 20/4016; H04W 4/025
USPC ................... 455/410, 411, 456.1, 456.2, 419
See application file for complete search history.

(56) References Cited

U.S. PATENT DOCUMENTS

| | | |
|---|---|---|
| 5,475,839 A | 12/1995 | Watson et al. |
| 5,655,004 A | 8/1997 | Holbrook et al. |
| 7,071,113 B2 | 7/2006 | Kim et al. |
| 7,600,676 B1 | 10/2009 | Rados et al. |
| 7,707,120 B2 | 4/2010 | Dominguez et al. |

(Continued)

FOREIGN PATENT DOCUMENTS

GB      401015 A     11/1933

OTHER PUBLICATIONS

Rocha et al.; A2BeST: An adaptive authentication service based on mobile user's behavior and spatio-temporal context; Published in: Computers and Communications (ISCC), 2011 IEEE Symposium on; Date of Conference: Jun. 28-Jul. 1, 2011; 2011; IEEE Xplore.

(Continued)

*Primary Examiner* — Sam Bhattacharya
(74) *Attorney, Agent, or Firm* — Michael A. Springs; Moore & Van Allen PLLC; Anup Shrinivasan (57) ABSTRACT

Systems, computer program products, and methods are described herein for remotely controlling access to a mobile device. The present invention is configured to receive an indication that a transaction executed by a user is misappropriate, wherein the transaction is executed by the user using a mobile device; transmit control signals configured to cause the misappropriation application to begin running in the background of the mobile device; initiate, via the misappropriation application, one or more actions to be executed on the mobile device of the user based on at least receiving the indication that the transaction executed by the user is misappropriate; determine an alternative communication form associated with the user; transmit a notification to the user via the alternate communication form, when the notification further comprises an indication that one or more functionalities of the mobile device has been limited.

20 Claims, 6 Drawing Sheets

(56) References Cited

U.S. PATENT DOCUMENTS

| | | |
|---|---|---|
| 7,769,991 B2 | 8/2010 | Niemelä |
| 7,899,753 B1 | 3/2011 | Everhart |
| 7,900,262 B2 | 3/2011 | Ozawa |
| 8,087,085 B2 | 12/2011 | Hu et al. |
| 8,195,576 B1 | 6/2012 | Grigg et al. |
| 8,312,545 B2 | 11/2012 | Tuvell et al. |
| 8,341,749 B2 | 12/2012 | Rogel |
| 8,346,666 B2 | 1/2013 | Lindelsee et al. |
| 8,355,982 B2 | 1/2013 | Hazel et al. |
| 8,380,177 B2 | 2/2013 | Laracey |
| 8,522,039 B2 | 8/2013 | Hyndman et al. |
| 8,572,391 B2 | 10/2013 | Golan et al. |
| 8,595,491 B2 | 11/2013 | Nice et al. |
| 8,635,157 B2 | 1/2014 | Smith et al. |
| 8,713,684 B2 | 4/2014 | Bettini et al. |
| 8,782,792 B1 | 7/2014 | Bodke |
| 8,819,772 B2 | 8/2014 | Bettini et al. |
| 8,844,038 B2 | 9/2014 | Niemelä |
| 8,863,279 B2 | 10/2014 | McDougal et al. |
| 8,904,525 B1 | 12/2014 | Hodgman et al. |
| 8,984,632 B1 | 3/2015 | Laffoon et al. |
| 9,058,607 B2 | 6/2015 | Ganti et al. |
| 9,064,115 B2 | 6/2015 | Tuvell et al. |
| 9,069,957 B2 | 6/2015 | Tuvell et al. |
| 9,104,871 B2 | 8/2015 | Tuvell et al. |
| 9,143,529 B2 | 9/2015 | Qureshi et al. |
| 9,363,278 B2 | 6/2016 | Maria |
| 9,569,767 B1 * | 2/2017 | Lewis .................. G06Q 20/327 |
| 9,654,982 B2 | 5/2017 | Bank et al. |
| 2006/0021003 A1 | 1/2006 | Fisher et al. |
| 2006/0073811 A1 | 4/2006 | Ekberg |
| 2006/0123465 A1 | 6/2006 | Ziegler |
| 2007/0030539 A1 | 2/2007 | Nath et al. |
| 2009/0254975 A1 | 10/2009 | Turnbull et al. |
| 2009/0265775 A1 | 10/2009 | Wisely et al. |
| 2010/0051685 A1 | 3/2010 | Royyuru et al. |
| 2010/0125495 A1 | 5/2010 | Smith et al. |
| 2011/0047597 A1 | 2/2011 | Mahaffey et al. |
| 2011/0145920 A1 | 6/2011 | Mahaffey et al. |
| 2012/0151559 A1 | 6/2012 | Koudys et al. |
| 2012/0197740 A1 | 8/2012 | Grigg et al. |
| 2012/0265631 A1 | 10/2012 | Cronic et al. |
| 2012/0329388 A1 | 12/2012 | Royston et al. |
| 2013/0023240 A1 | 1/2013 | Weiner |
| 2013/0174265 A1 | 7/2013 | Chan et al. |
| 2013/0226800 A1 | 8/2013 | Patel et al. |
| 2013/0232542 A1 | 9/2013 | Cheng et al. |
| 2013/0275303 A1 | 10/2013 | Fiore et al. |
| 2013/0282588 A1 | 10/2013 | Hruska |
| 2013/0347100 A1 | 12/2013 | Tsukamoto et al. |
| 2014/0372308 A1 | 12/2014 | Sheets |
| 2015/0220907 A1 | 8/2015 | Denton et al. |
| 2016/0134488 A1 | 5/2016 | Straub et al. |
| 2016/0173506 A1 | 6/2016 | Bank et al. |
| 2016/0173508 A1 | 6/2016 | Kozlovsky et al. |
| 2016/0180322 A1 | 6/2016 | Song et al. |
| 2016/0255050 A1 | 9/2016 | Grayson et al. |
| 2017/0032114 A1 * | 2/2017 | Turgeman ............... G06F 21/32 |

OTHER PUBLICATIONS

Xiong et al.; A spatial entropy-based approach to improve mobile risk-based authentication; Published in: Proceeding GeoPrivacy '14 Proceedings of the 1st ACM SIGSPATIAL International Workshop on Privacy in Geographic Information Collection and Analysis Article No. 3; 2014; ACM Digital Library.

Meyer, Roger. Secure Authentication on the Internet (Apr. 4, 2007). Retrieved online Mar. 27, 2012. http://www.sans.org/reading_room/whitepapers/securecode/secure-authentication-internet_2084. 36 pps.

* cited by examiner

SYSTEM FOR REMOTELY CONTROLLING ACCESS TO A MOBILE DEVICE

BACKGROUND

With recent technological advancements, mobile commerce transactions are starting to become increasingly common among the general public. That are a number of factors that may influence continued adoption of mobile commerce transactions that customers and merchants alike should keep in mind when determining their best defense against misappropriation in this channel. Whether used as an extension of online shopping or for mobile proximity payments, protecting the mobile channel and/or the mobile device used in the transaction calls for an effective yet realistic misappropriation prevention strategy. The present invention addresses this issue by implementing a system for remotely controlling access to a mobile device that has been involved in misappropriate mobile commerce transactions.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for remotely controlling access to a mobile device is presented. The system comprises at least one non-transitory storage device; at least one processor; and at least one module stored in said storage device and comprising instruction code that is executable by the at least one processor and configured to cause said at least one processor to: provide a misappropriation application for installation on a mobile device of a user, wherein the misappropriation application is inactive; receive an indication that a transaction executed by a user is misappropriate, wherein the transaction is executed by the user using a mobile device, wherein the mobile device is in possession of the user, wherein the transaction is executed by the user at a merchant location; establish a communication link with the mobile device of the user, wherein establishing further comprises creating a wireless data channel with the mobile device; transmit control signals, via the established communication link, configured to cause the misappropriation application to begin running in the background of the mobile device; initiate, via the misappropriation application, one or more actions to be executed on the mobile device of the user based on at least receiving the indication that the transaction executed by the user is misappropriate, wherein the one or more actions limit one or more functionalities of the mobile device; determine an alternate communication form associated with the user; and transmit a notification to the user via the alternate communication form, when the notification further comprises an indication that one or more functionalities of the mobile device has been limited.

In some embodiments, the module is further configured to cause the at least one processor to determine a location associated with the mobile device, wherein determining the location further comprises determining global positioning system (GPS) coordinates associated with the mobile device.

In some embodiments, the module is further configured to cause the at least one processor to continuously monitor the location of the mobile device for a predetermined period of time after the mobile device has left a vicinity of the merchant location.

In some embodiments, the module is further configured to cause the at least one processor to determine the location of the mobile device wherein determining the location further comprises: transmitting control signals via the established communication link to initiate an image capturing component associated with the mobile device to capture images periodically; and receiving, via the established communication link, the captured images.

In some embodiments, the module is further configured to cause the at least one processor to limit one or more functionalities of the mobile device, wherein limiting the one or more functionalities further comprises disabling one or more features of the mobile device.

In some embodiments, the module is further configured to cause the at least one processor to disable one or more features of the mobile device based on at least a predefined user preference.

In some embodiments, the module is further configured to cause the at least one processor to: receive one or more authentication credentials from the user in response to transmitting a notification indicating that the one or more functionalities of the mobile device has been limited; verify the one or more authentication credentials received from the user, wherein verifying further comprises validating an identity of the user; transmit control signals, via the established communication link, to remove limitations placed on the one or more functionalities of the mobile device.

In some embodiments, the module is further configured to cause the at least one processor to: determine one or more other merchant transactions executed by the user using the mobile device after receiving an indication that the transaction executed by the user using the mobile device at the merchant location is misappropriate; and transmit control signals configured to cause the misappropriation application to transmit an alert to one or more other merchants associated with the one or more other merchant transactions executed by the user using the mobile device, wherein the alert indicates that the mobile device used to execute the transaction is associated with misappropriate activity.

In some embodiments, the module is further configured to cause the at least one processor to deny one or more transactions executed by the user using the mobile device at the one or more other merchant locations based on at least the alert received from the misappropriation application.

In another aspect, a method for remotely controlling access to a mobile device is presented. The method comprising: providing, using a computing device processor, a misappropriation application for installation on a mobile device of a user, wherein the misappropriation application is inactive; receiving, using a computing device processor, an indication that a transaction executed by a user is misappropriate, wherein the transaction is executed by the user using a mobile device, wherein the mobile device is in possession of the user, wherein the transaction is executed by the user at a merchant location; establishing, via a computing device processor, a communication link with the mobile device of the user, wherein establishing further comprises creating a wireless data channel with the mobile device; transmitting control signals, via the established communication link, configured to cause the misappropriation application to begin running in the background of the mobile device; initiate, via the misappropriation application, one or more actions to be executed on the mobile device of the user based on at least receiving the indication that the transaction executed by the user is misappropriate, wherein the one or more actions limit one or more functionalities of the mobile device; determining, using a computing device processor, an alternate communication form associated with the user; and transmit a notification to the user via the alternate communication form, when the notification further comprises an indication that one or more functionalities of the mobile device has been limited.

In another aspect, a computer program product for remotely controlling access to a mobile device is presented. The computer program product comprising a non-transitory computer-readable medium comprising code causing a first apparatus to: provide a misappropriation application for installation on a mobile device of a user, wherein the misappropriation application is inactive; receive an indication that a transaction executed by a user is misappropriate, wherein the transaction is executed by the user using a mobile device, wherein the mobile device is in possession of the user, wherein the transaction is executed by the user at a merchant location; establish a communication link with the mobile device of the user, wherein establishing further comprises creating a wireless data channel with the mobile device; transmit control signals, via the established communication link, configured to cause the misappropriation application to begin running in the background of the mobile device; initiate, via the misappropriation application, one or more actions to be executed on the mobile device of the user based on at least receiving the indication that the transaction executed by the user is misappropriate, wherein the one or more actions limit one or more functionalities of the mobile device; determine an alternative communication form associated with the user; and transmit a notification to the user via the alternate communication form, when the notification further comprises an indication that one or more functionalities of the mobile device has been limited.

BRIEF DESCRIPTION OF THE FIGURES

Having thus described embodiments of the invention in general terms, reference will now be made to the accompanying drawings, where:

DETAILED DESCRIPTION OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Misappropriation of mobile commerce transactions typically refers to misrepresentation of one or more financial payment vehicles in a mobile commerce transaction. Such misappropriation may also be an adjunct to misrepresentation of identity. Typically, each merchant implements a merchant specific misappropriation protection from mobile commerce transactions. However, the implementation of a merchant specific misappropriation protection is an expensive process and may not be economically feasible for all merchants. This may create a discrepancy in the implementation of merchant specific misappropriation protection for mobile commerce transactions among large merchants who may be able to afford the protection and small merchants who may not be able to afford the protection. The present invention provides the functional benefit of transferring the burden of providing protection over misappropriate mobile commerce transactions to a third-party, thus ensuring an adequate and comprehensive protection for all merchants equally.

In some embodiments, an "entity" as used herein may be a financial institution. A "facility" may be physical premises associated with the entity. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, etc. The account is associated with and/or maintained by the entity. In other embodiments, an "entity" may not be a financial institution. In other embodiments, an entity may or may not allow the user to establish an account associated with the entity.

In some embodiments, the "user" may be a customer (e.g., an account holder or a person who has an account (e.g., banking account, credit account, etc.) at the entity) or potential customer (e.g., a person who has submitted an application for an account, a person who is the target of marketing materials that are distributed by the entity, a person who applies for a loan that not yet been funded). In some other embodiments the "user" may be a person that executes a misappropriate mobile commerce transaction.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

In accordance with embodiments of the invention the terms "customer" and "user" and "consumer" may be interchangeable. These terms may relate to a direct customer of the financial institution or person or entity that has authorization to act on behalf of the direct customer, user, or consumer (i.e., indirect customer).

Figure 1:
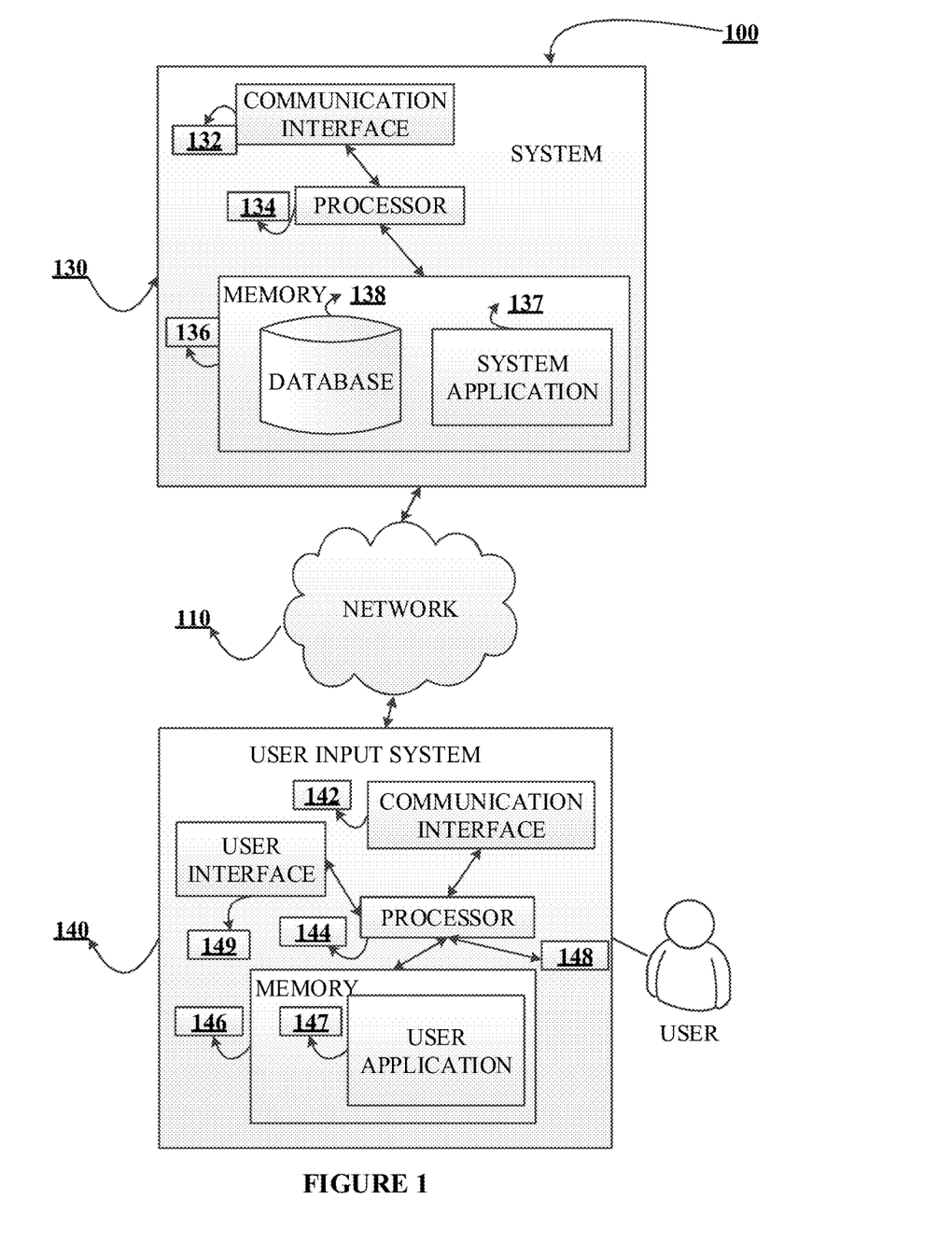
FIG. 1 presents an exemplary block diagram of the system environment, in accordance with embodiments of the present invention.

FIG. 1 presents an exemplary block diagram of the system environment 100 for implementing the process flows described herein in accordance with embodiments of the present invention. As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute a user application 147. The user application 147 may be an application to communicate with the system 130, perform a transaction, input information onto a user interface presented on the user input system 140, or the like. The user application 147 and/or the system application 137 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like. In some embodiments, for example, the user input system 140 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein. Specifically, the user application 147 executes the process flows described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, or the like) may enable at least the user input system 140 or an external server or computing device in communication with the user input system 140 to determine the location (e.g. location coordinates) of the user input system 140.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

Each memory device described herein, including the memory 146 for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the business. The system 130 may be located at the facility associated with the business or remotely from the facility associated with the business. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system.

It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein.

Figure 2:
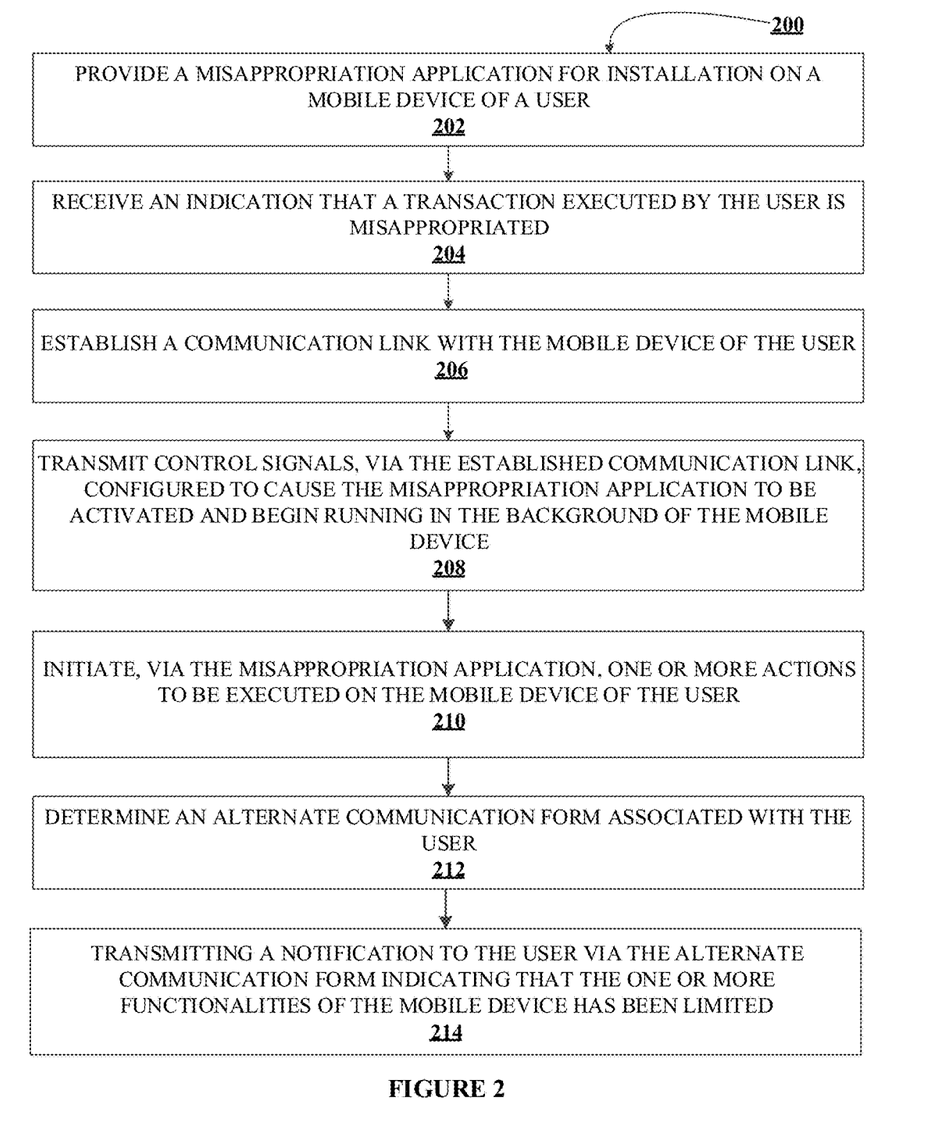
FIG. 2 presents a process flow for remotely controlling access to a mobile device, in accordance with embodiments of the invention.

FIG. 2 illustrates a high-level process flow for remotely controlling access to a mobile device 200. As shown in block 202, the process flow includes providing a misappropriation application for installation on a mobile device of a user. In some embodiments, the misappropriation application is inactive. In this regard, the misappropriation application may be installed on the mobile device of the user but remains dormant until activated. Next, as shown in block 204, the process flow includes receiving an indication that a transaction executed by the user is misappropriated. In some embodiments the transaction is executed by the user using a mobile device that is in possession of the user. In this regard, the user may utilize the mobile commerce facility available on the mobile device to execute one or more transactions with a merchant at a merchant location.

Next, as shown in block 206, the process flow includes establishing a communication link with the mobile device of the user. In this regard, the system may be configured to establish a wireless data channel between the system and the mobile device. Next, as shown in block 208, the process flow includes transmitting control signals, via the established communication link, configured to cause the misappropriation application to be activated and begin running in the background of the mobile device. In this way, the system may be configured to initiate the misappropriation application on the mobile device without the knowledge of the user who has executed the misappropriated transaction. In doing so, the otherwise dormant misappropriation application is activated and connects to the system via the wireless data channel established between the system and the mobile device.

Next, as shown in block 210, the process flow includes initiating, via the misappropriation application, one or more actions to be executed on the mobile device of the user. In this regard, the system may be configured to initiate the one or more actions based on at least receiving the indication that the transaction executed by the users inappropriate. In some embodiments, the one or more actions limit one or more functionalities of the mobile device. In one aspect, the system may be configured to disable one or more specific features of the mobile device. In this regard, the system may retrieve preconfigured user preferences from a financial institution database to determine which of the one or more specific features to disable when a misappropriated transaction is detected. In some embodiments, the system may be configured to select one or more specific features of the mobile device based on at least default parameters presented by the entity.

In some embodiments, the system may be configured to determine the location associated with the mobile device. Since the user is considered to be in possession of the mobile device, determining the location of the mobile device may be considered as determining a physical location of the user. This is typically achieved by collecting a set of data comprising information related to the location of the mobile device/the physical location of the user. This set of data may be collected from a variety of sources and may include data drawn from one or more of the sources. The set of data may include positioning data of the customer, consistent with embodiments of the present invention.

The positioning data may include global positioning data. Global positioning data may include any information collected from methods, systems, apparatus, computer programs etc. involving locating a user's position relative to satellites, fixed locations, beacons, transmitters or the like. In some instances, global positioning data may be collected from a GPS device, such as a navigation system. Such a navigation system may be, but is not limited to, hardware and/or software that is part of a mobile phone of the user or any other device used in the execution of the transaction, such as a smartphone, PDA, automobile, watch etc.

For instance, in some embodiments, the global positioning data will be snapshots of the user's location at different times. For example, a snapshot of the user's location may be collected each time the GPS software, navigation system or application is activated. The global positioning data may also include the destination entered by the user, recent searches for locations, attractions, addresses etc. In other instances, the global positioning data may be the complete route being provided to the GPS system's user, including destination, route, alternate routes, anticipated time of arrival etc. In some such embodiments, the global positioning data may include an indication if the customer selects a detour from a previously selected route, or instructs the navigation system to reach the desired location taking specific roads or avoiding certain roads.

Positioning data of the customer may include mobile device data. Mobile device data may include information regarding the location of the customer's mobile device. Such a mobile device may include, but is not limited to, a cellular telecommunications device (i.e., a cell phone or mobile phone), personal digital assistant (PDA), smartphone, a mobile Internet accessing device, or other mobile device including, but not limited to portable digital assistants (PDAs), pagers, gaming devices, laptop computers, tablet computers, and any combination of the aforementioned, or the like. For instance, the location of the mobile phone may be dynamically determined from the cell phone signal and cell towers being accessed by the mobile phone. In other instances, a mobile device may include software or hardware to locate the position of the mobile phone from GPS signals, wireless network locations, and the like. Mobile device data may further include information from an accelerometer that is a part of the mobile device and provides information regarding whether the mobile device is moving, and if so, in what direction. In some embodiments, mobile device data may be the time and location of calls placed using the telephone functionality of a mobile device. In yet other embodiments, the mobile device data may be data collected and analyzed by the hardware and/or software of the mobile device concerning the surrounding environment. In such embodiments, hardware, such as a video capture device, camera or the like and software that is stored in the memory of a mobile device captures a video stream of the environment surrounding the mobile device and through object recognition, compass direction, the location of the mobile device, and other such data identifies information about the objects identified in the surrounding environment and/or the environment itself. For example, in use, a user may use the camera built into her smartphone to collect a real-time video stream that includes images of the façade of a store front and the surrounding area. This image may include the store's name from a marquee, a street address (collected from an image of the numbers on the building and of street signs in the video image) and the direction the smartphone is facing (from a compass in the mobile device). Such information may be sufficient to locate the user's position and potentially the direction the user is facing and/or traveling.

Positioning data of the customer may also be collected from Internet data. Internet data, may include any information relating to the searches conducted by the customer, website's visited by the customer and the like that suggests the customer's present or future location(s). For instance, in preparing for a vacation a customer may conduct searches for hotels, restaurants or activities in the area where the customer will be staying. Similarly, a customer may review weather forecasts for locations other than her place of residence indicating that she may soon be traveling to that location. A customer may also search for construction or traffic reports indicating future travel along certain roads. Moreover, changes in search patterns may suggest a customer's future location. For instance if a customer usually uses a web browser application just to read online news articles or to check sports scores but suddenly begins to search for camping gear, hiking manuals and boots it may be indicative that the customer is anticipating taking a hiking trip and will be traveling away from her home area. It will be understood that such Internet data may relate to searches or websites visited by the customer before she began traveling, however, inasmuch as many mobile devices also include mobile Internet connectivity, it will also be understood that such information may be dynamically collected as the customer travels.

In some embodiments, the system may be configured to continuously monitor the location of the mobile device for a predetermined period of time after the mobile device has left the vicinity of the merchant location. In this regard, the system may be configured to transmit control signals, via the established communication link, to initiate an image capturing component associated with the mobile device to capture images periodically. In this way, the system may monitor the surroundings of the user by activating the image capturing component to capture images, videos, audio, or the like, to accurately determine the location of the user in combination with the set of data used to determine the location of the mobile device, as detailed above.

Next, as shown in block 212, the process flow includes determining an alternate communication form associated with the user. For example, the alternate communication form may include, but is not limited to, an alternative telephone number, an email, social media, text message, a pop-up notification, or the like. In some embodiments, the alternate communication form may be predefined by the user when the user first became a financial institution customer. In response to determining an alternative communication form, the process flow includes transmitting a notification to the user via the alternate communication form indicating that the one or more functionalities of the mobile device has been limited, as shown in block 214.

In some embodiments, the system may be configured to restrict the user from executing any further transactions once the misappropriate transaction is detected. In this regard, the system may be configured to determine one or more other merchant transactions executed by the user using the mobile device after receiving an indication that the transaction executed by the user using the mobile device at the merchant location is misappropriate. In response, the system may transmit control signals configured to cause the misappropriation application to transmit an alert to one or more other merchants associated with the one or more other merchant transactions executed by the user using the mobile device. In this regard, the alert may be transmitted to the merchant when the user executes a transaction at a point of sale terminal of the merchant. In some embodiments, in response to receiving the alert, the point of sale terminal of the merchant may automatically deny the transaction. In some other embodiments, in response to receiving the alert, the point of sale terminal of the merchant may transmit a notification to the system indicating that the mobile device associated with misappropriate transaction has attempted to execute another transaction. In this way, the system may receive the notification from the point of sale terminal of the merchant, and in response, transmit control signals configured to cause the point of sale terminal of the merchant to deny the transaction.

In some embodiments, the user may have to provide one or more authentication credentials to restore access due to one or more disabled functionalities/features of the mobile device. In this regard, the system may be configured to receive one or more authentication credentials from the user in response to transmitting a notification indicating that the one or more functionalities of the mobile device has been limited. Typically, the user may be required to authenticate identity for access to an application or device, or for access to a particular feature, function or action of an application or device. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used.

For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Figure 3A:
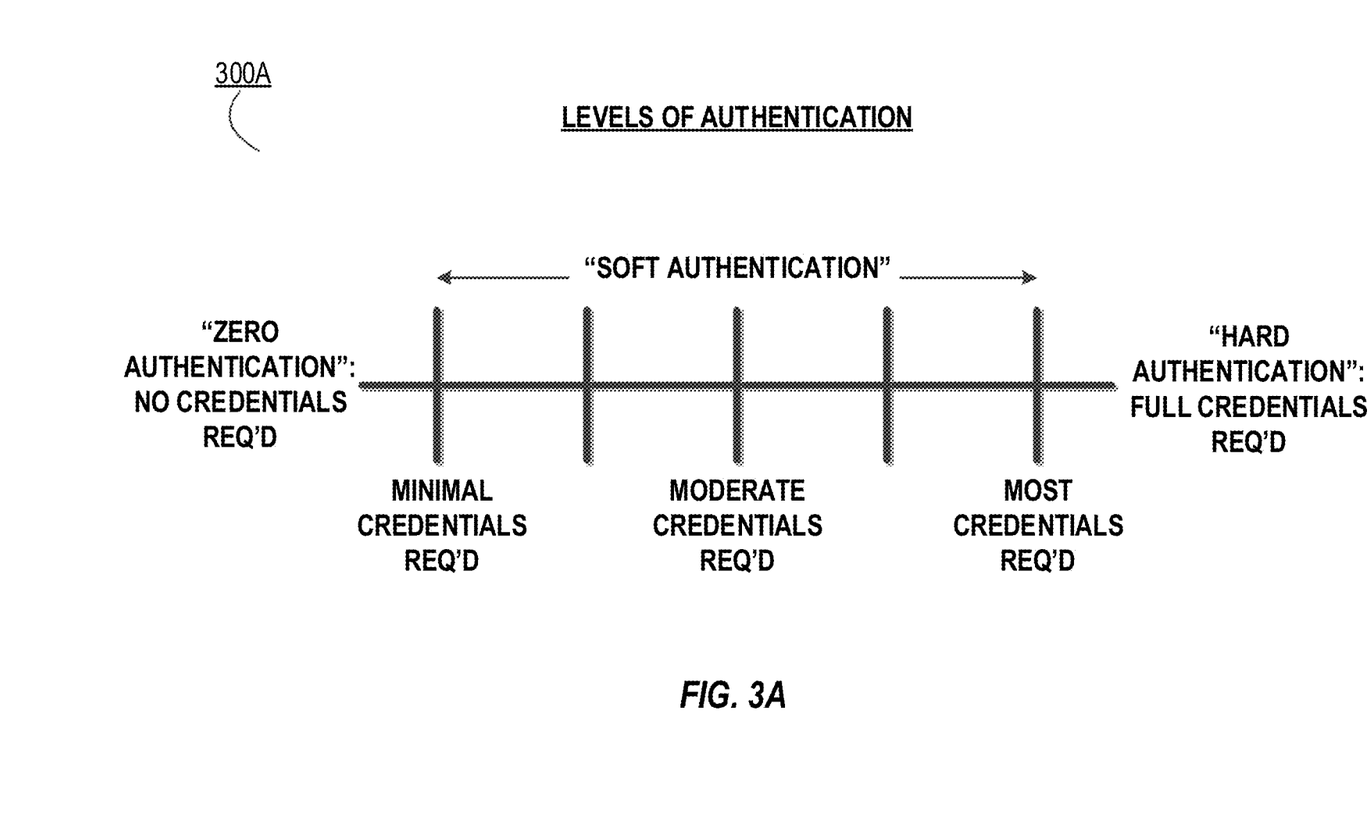
FIG. 3A presents an illustration of the authentication continuum in accordance to one embodiment of the invention.

Referring to FIG. 3A, a continuum of authentication 300A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 3C, the continuum of authentication 300A may be coupled with an application functions permitted continuum 300B, first illustrated in FIG. 3B.

Figure 3B:
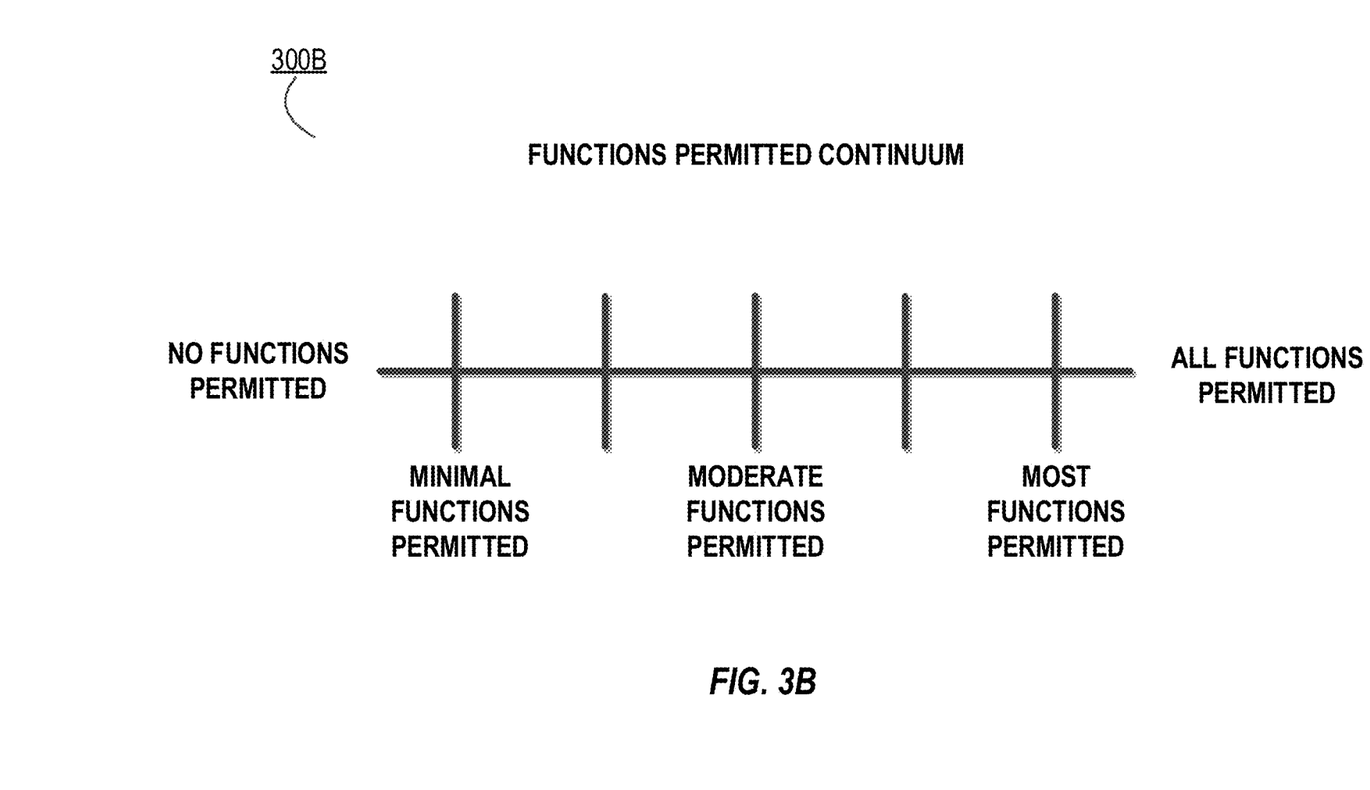
FIG. 3B presents an illustration of the functions permitted continuum in accordance to one embodiment of the invention.

Referring to FIG. 3B, the application functions permitted continuum 300B illustrates various levels of application functions permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 400B corresponds with a certain amount and/or number of functions that are permitted and/or the context in which certain functions are permitted.

Figure 3C:
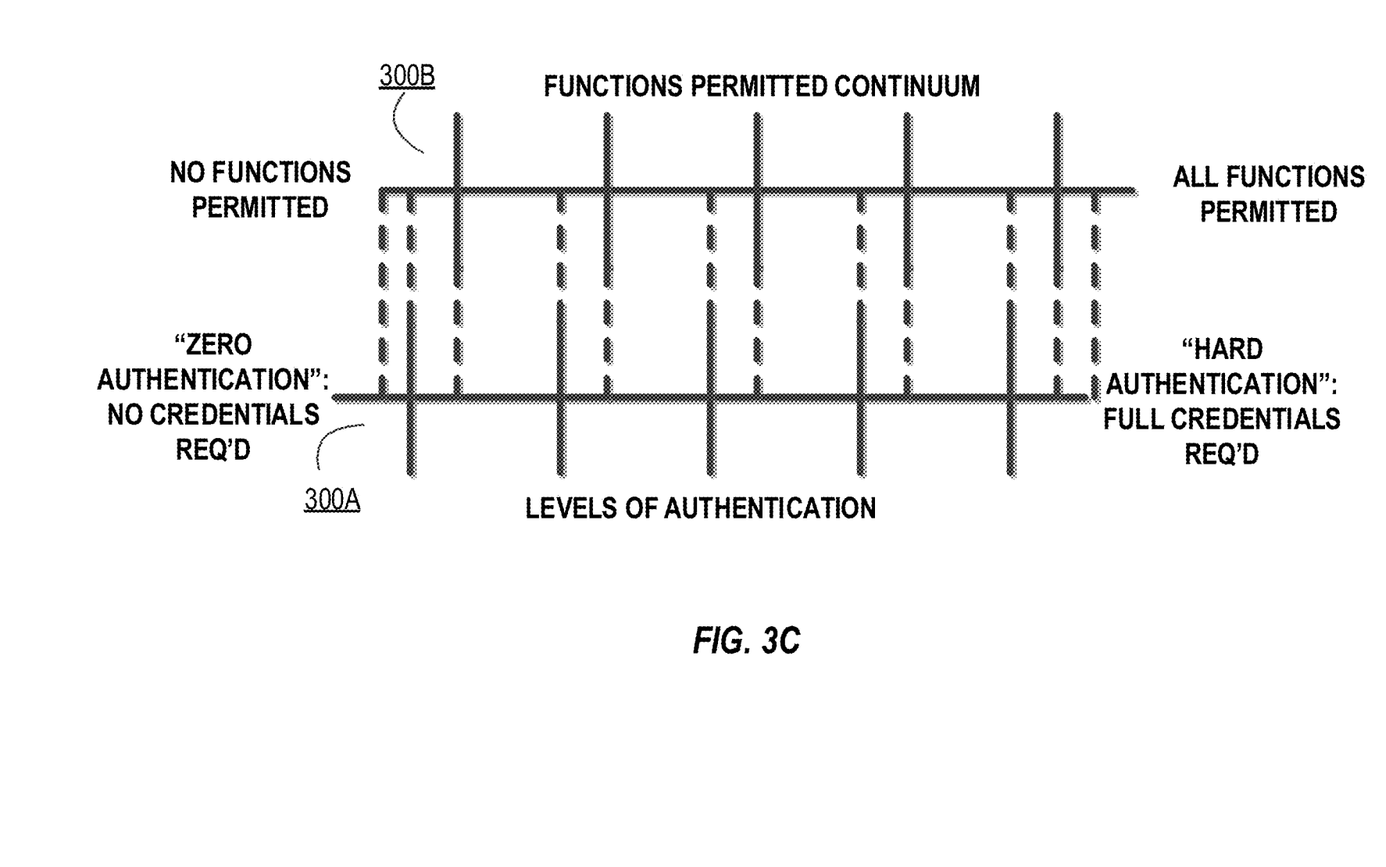
FIG. 3C presents an illustration of the coupling of the functions permitted continuum and the levels of authentication continuum in accordance to one embodiment of the invention.

Referring now to FIG. 3C, a diagram 300C illustrates a coupling of the application functions permitted continuum 300B and the levels of authentication continuum 300A. As shown, the continua 300B and 300A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 300B provides that a particular function or functions may be permitted given that a specified level of authentication credentials are supplied, as indicated by the corresponding point on continuum 300A. For example, a financial institution and/or a user may arrange the continua 300B and 300A with respect to one another and may adjust the arrangement based on changing desires or goals.

In some embodiments, one or both the continua 300B and 300A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Figure 3D:
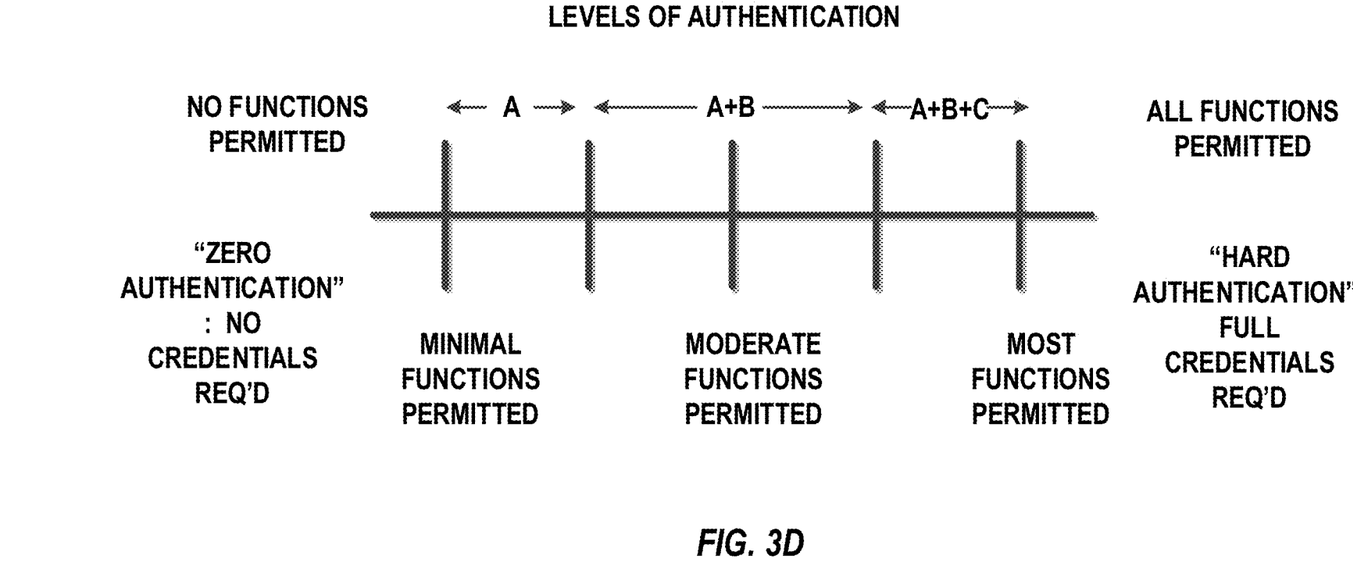
FIG. 3D presents an illustration of the relationship between the functions permitted and the authentication types in accordance to one embodiment of the invention

Referring now to FIG. 3D, a diagram 300D illustrates a relationship between the functions permitted and the authentication types. As shown in FIG. 3D, the soft authentication continuum between zero authentication and hard authentication may include one or more authentication types (A, B, C in the Figure). In one aspect, the one or more authentication types corresponding to the one or more authentication credentials received from the user and one or more functions associated with the application permitted for user access are positively correlated. For example, with respect to an online banking application, a username may enable the user to gain access to checking balance, a username and password may enable the user to gain access to checking balance, funds transfer between the user's first bank account and second bank account, and downloading previous statements, and a username, password and challenge question may enable the user to gain complete access to all the functions of the applications and devices. In one aspect, the user may have to provide authentication credentials corresponding to authentication types A and B to gain access to moderate functions associated with the application. For example, the user may provide a username and password to access a balance check and funds transfer. In another aspect, the user may have to provide authentication credentials corresponding to authentication types A, B, and C to gain access to most function associated with the application. For example, the user may provide a username, password, and a personal identification number to access a balance check, a funds transfer, a deposit, and a bill-pay. In yet another aspect, the user may have to only provide authentication credentials corresponding to authentication type A to gain access to minimal functions associated with the application. For example, the user may provide a username to access a balance check.

In response, the system may verify the one or more authentication credentials received from the user, wherein verifying further comprises validating the identity of the user. In doing so, the system may then transmit control signals, via the established communication link, remove limitations placed on the one or more functionalities of the mobile device.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
|---|---|---|---|
| 6968US1.014033.2594 | To be assigned | MOBILE DEVICE DATA SECURITY SYSTEM | Concurrently herewith |
| 6969US1.014033.2595 | To be assigned | SYSTEM FOR AUTHORIZING ACCESS BASED ON AUTHENTICATION VIA SEPARATE CHANNEL | Concurrently herewith |
| 6970US1.014033.2596 | To be assigned | SYSTEM FOR ESCALATING SECURITY PROTOCOL REQUIREMENTS | Concurrently herewith |
| 6971US1.014033.2597 | To be assigned | SYSTEM FOR ASSESSING NETWORK AUTHENTICATION REQUIREMENTS BASED ON SITUATIONAL INSTANCE | Concurrently herewith |

What is claimed is:

1. A system for remotely controlling access to a mobile device, the system comprising:

at least one non-transitory storage device;
at least one processor; and
at least one module stored in said storage device and comprising instruction code that is executable by the at least one processor and configured to cause said at least one processor to:
provide a misappropriation application for installation on a mobile device of a user, wherein the misappropriation application is initially inactive;
receive an indication that a transaction executed by a user is misappropriate, wherein the transaction is executed by the user using the mobile device, wherein the mobile device is in possession of the user, wherein the transaction is executed by the user at a merchant location;
establish a communication link with the mobile device of the user, wherein establishing further comprises creating a wireless data channel with the mobile device;
transmit control signals, via the established communication link, configured to cause the misappropriation application to begin running in the background of the mobile device;
initiate, via the misappropriation application, one or more actions to be executed on the mobile device of the user based on at least receiving the indication that the transaction executed by the user is misappropriate, wherein the one or more actions limit one or more functionalities of the mobile device, wherein limiting further comprises disabling one or more features of the mobile device based on at least a predefined user preference;
determine an alternative communication form associated with the user;
transmit a notification to the user via the alternate communication form, wherein the notification further comprises an indication that one or more features of the mobile device has been disabled;
receive one or more authentication credentials from the user in response to transmitting a notification indicating that the one or more features of the mobile device has been disabled;
verify the one or more authentication credentials received from the user, wherein verifying further comprises validating an identity of the user;
transmit control signals, via the established communication link, to re-enable the one or more features previously disabled on the mobile device.

2. The system of claim 1, wherein the module is further configured to cause the at least one processor to determine a location associated with the mobile device, wherein determining the location further comprises determining global positioning system (GPS) coordinates associated with the mobile device.

3. The system of claim 2, wherein the module is further configured to cause the at least one processor to continuously monitor the location of the mobile device for a predetermined period of time after the mobile device has left a vicinity of the merchant location.

4. The system of claim 2, wherein the module is further configured to cause the at least one processor to determine the location of the mobile device wherein determining the location further comprises:
- transmitting control signals via the established communication link to initiate an image capturing component associated with the mobile device to capture images periodically; and
- receiving, via the established communication link, the captured images.

5. The system of claim 1, wherein the module is further configured to cause the at least one processor to:
- determine one or more other merchant transactions executed by the user using the mobile device after receiving an indication that the transaction executed by the user using the mobile device at the merchant location is misappropriate; and
- transmit control signals configured to cause the misappropriation application to transmit an alert to one or more other merchants associated with the one or more other merchant transactions executed by the user using the mobile device, wherein the alert indicates that the mobile device used to execute the transaction is associated with misappropriate activity.

6. The system of claim 5, wherein the module is further configured to cause the at least one processor to deny one or more transactions executed by the user using the mobile device at the one or more other merchant locations based on at least the alert received from the misappropriation application.

7. The system of claim 1, wherein the module is further configured to cause the at least one processor to implement a continuum of authentication to quantify one or more levels of authentication, and a continuum of functions to define a number of accessible functions based on the continuum of authentication.

8. A computerized method for remotely controlling access to a mobile device, the method comprising:
- providing, using a computing device processor, a misappropriation application for installation on a mobile device of a user, wherein the misappropriation application is initially inactive;
- receiving, using a computing device processor, an indication that a transaction executed by a user is misappropriate, wherein the transaction is executed by the user using the mobile device, wherein the mobile device is in possession of the user, wherein the transaction is executed by the user at a merchant location;
- establishing, via a computing device processor, a communication link with the mobile device of the user, wherein establishing further comprises creating a wireless data channel with the mobile device;
- transmitting control signals, via the established communication link, configured to cause the misappropriation application to begin running in the background of the mobile device;
- initiating, via the misappropriation application, one or more actions to be executed on the mobile device of the user based on at least receiving the indication that the transaction executed by the user is misappropriate, wherein the one or more actions limit one or more functionalities of the mobile device, wherein limiting further comprises disabling one or more features of the mobile device based on at least a predefined user preference;
- determining, using a computing device processor, an alternate communication form associated with the user;
- transmit a notification to the user via the alternate communication form, wherein the notification further comprises an indication that one or more features of the mobile device has been disabled;
- receiving, using a computing device processor, one or more authentication credentials from the user in response to transmitting a notification indicating that the one or more features of the mobile device has been disabled;
- verifying, using a computing device processor, the one or more authentication credentials received from the user, wherein verifying further comprises validating an identity of the user;
- transmitting control signals, via the established communication link, to re-enable the one or more features previously disabled on the mobile device.

9. The method of claim 8, wherein the method further comprises determining a location associated with the mobile device, wherein determining the location further comprises determining global positioning system (GPS) coordinates associated with the mobile device.

10. The method of claim 9, wherein the method further comprises continuously monitoring the location of the mobile device for a predetermined period of time after the mobile device has left a vicinity of the merchant location.

11. The method of claim 9, wherein the method further comprises determining the location of the mobile device wherein determining the location further comprises:
- transmitting control signals via the established communication link to initiate an image capturing component associated with the mobile device to capture images periodically; and
- receiving, via the established communication link, the captured images.

12. The method of claim 8, wherein the method further comprises:
- determining one or more other merchant transactions executed by the user using the mobile device after receiving an indication that the transaction executed by the user using the mobile device at the merchant location is misappropriate; and
- transmitting control signals configured to cause the misappropriation application to transmit an alert to one or more other merchants associated with the one or more other merchant transactions executed by the user using the mobile device, wherein the alert indicates that the mobile device used to execute the transaction is associated with misappropriate activity.

13. The method of claim 12, wherein the method further comprises denying one or more transactions executed by the user using the mobile device at the one or more other merchant locations based on at least the alert received from the misappropriation application.

14. The method of claim 8, wherein the method further comprises implementing a continuum of authentication to quantify one or more levels of authentication, and a continuum of functions to define a number of accessible functions based on the continuum of authentication.

15. A computer program product for remotely controlling access to a mobile device, the computer program product comprising a non-transitory computer-readable medium comprising code causing a first apparatus to:

provide a misappropriation application for installation on a mobile device of a user, wherein the misappropriation application is initially inactive;

receive an indication that a transaction executed by a user is misappropriate, wherein the transaction is executed by the user using the mobile device, wherein the mobile device is in possession of the user, wherein the transaction is executed by the user at a merchant location;

establish a communication link with the mobile device of the user, wherein establishing further comprises creating a wireless data channel with the mobile device;

transmit control signals, via the established communication link, configured to cause the misappropriation application to begin running in the background of the mobile device;

initiate, via the misappropriation application, one or more actions to be executed on the mobile device of the user based on at least receiving the indication that the transaction executed by the user is misappropriate, wherein the one or more actions limit one or more functionalities of the mobile device, wherein limiting further comprises disabling one or more features of the mobile device based on at least a predefined user preference;

determine an alternative communication form associated with the user;

transmit a notification to the user via the alternate communication form, wherein the notification further comprises an indication that one or more features of the mobile device has been disabled;

receive one or more authentication credentials from the user in response to transmitting a notification indicating that the one or more features of the mobile device has been disabled;

verify the one or more authentication credentials received from the user, wherein verifying further comprises validating an identity of the user;

transmit control signals, via the established communication link, to re-enable the one or more features previously disabled on the mobile device.

16. The computer program product of claim 15, wherein the first apparatus is further configured to determine a location associated with the mobile device, wherein determining the location further comprises determining global positioning system (GPS) coordinates associated with the mobile device.

17. The computer program product of claim 16, wherein the first apparatus is further configured to continuously monitor the location of the mobile device for a predetermined period of time after the mobile device has left a vicinity of the merchant location.

18. The computer program product of claim 16, wherein the first apparatus is further configured to determine the location of the mobile device wherein determining the location further comprises:

transmitting control signals via the established communication link to initiate an image capturing component associated with the mobile device to capture images periodically; and receiving, via the established communication link, the captured images.

19. The computer program product of claim 15, wherein the first apparatus is further configured to:

determine one or more other merchant transactions executed by the user using the mobile device after receiving an indication that the transaction executed by the user using the mobile device at the merchant location is misappropriate; and transmit control signals configured to cause the misappropriation application to transmit an alert to one or more other merchants associated with the one or more other merchant transactions executed by the user using the mobile device, wherein the alert indicates that the mobile device used to execute the transaction is associated with misappropriate activity.

20. The computer program product of claim 19, wherein the first apparatus is further configured to deny one or more transactions executed by the user using the mobile device at the one or more other merchant locations based on at least the alert received from the misappropriation application.

* * * * *